United States Patent Office 2,813,853
Patented Nov. 19, 1957

2,813,853

MONOAZO DYESTUFFS AND METAL COMPLEX COMPOUNDS THEREOF

Willy Steinemann, Basel, Switzerland, assignor, by mesne assignments, to Saul & Co., Newark, N. J., as nominee of Fidelity Union Trust Company, executive trustee under Sandoz Trust No Drawing. Application June 27, 1955,
Serial No. 518,398

Claims priority, application Switzerland June 29, 1954

6 Claims. (Cl. 260—145)

The present invention relates to monoazo dyestuffs and metal complex compounds thereof.

More particularly, the invention has especial relation to monoazo dyestuffs which, in the metal-free state, correspond to the formula

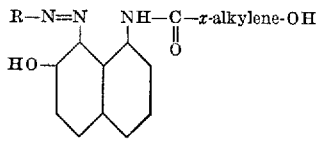

wherein $x$ represents a simple carbon-to-carbon bond or an —$OCH_2$— bridge, and R stands for a radical of the benzene series having an hydroxyl or methoxy group in ortho-position to the azo group.

These dyestuffs can be prepared by coupling 1 mol of the diazo compound of a 2-amino-1-hydroxy- or -methoxybenzene with 1 mol of a 1-hydroxyacylamino-7-hydroxynaphthalene corresponding to the formula

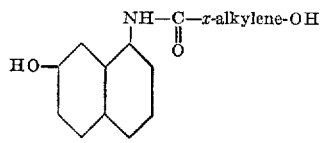

wherein $x$ has the previously-recited significance.

Illustrative of diazo compounds which may be used in building up the dyestuffs of the present invention are inter alia 2-amino-1-hydroxybenzene, 2-amino-1-hydroxy-halogenobenzenes, 2-amino-1-hydroxy-nitrobenzenes, 2-amino-1-hydroxy-halogeno-nitrobenzenes, 2-amino-1-hydroxyacylamino - halogenobenzenes, 2-amino-1-hydroxy-acylaminonitrobenzenes, the many 2-amino-1-hydroxy-benzene-sulfonamides and their derivatives which are substituted at the nitrogen atom of the sulfonamide group by alkyl, halogenalkyl, hydroxyalkyl, alkoxyalkyl, aralkyl, carbocyclic and heterocyclic groups, 2-amino-1-hydroxy-sulfonylbenzenes and the corresponding 2-amino-1-methoxy compounds, etc. Worthy of special mention in this connection are 2-amino-1-hydroxybenzene-4-sulfonamide, 2-amino - 1 - hydroxybenzene-4-sulfonic acid methylamide, 2-amino-1-hydroxybenzene-4-sulfonic acid-(2'-hydroxy) - ethylamide, 2-amino-1-hydroxybenzene-4-sulfonic acid-(3'-methoxy)-propylamide, 2-amino-1-hydroxybenzene-4-sulfonic acid benzylamide, 2-amino-1-hydroxybenzene-4-sulfonic acid cyclohexylamide, 2-amino-1-hydroxybenzene - 4 - sulfonic acid phenylamide—which may be further substituted at the phenylamido radical by a nuclearly bound carboxyl, acylamino, sulfonamido, sulfonic acid methylamido or sulfonic acid dimethylamido group—and 2-amino-1-hydroxy-4-methylsulfonyl-benzene.

The most important of the aforementioned 1-hydroxy-acylamino-7-hydroxynaphthalenes are 1-hydroxyacetyl-amino-7-hydroxynaphthalene and 1-carbo-(2'-hydroxy)-ethoxyamino-7-hydroxynaphthalene. These are conveniently prepared from the corresponding chlorocylamino compounds by heating to elevated temperature in formamide.

The coupling of the diazotized 2-amino-1-hydroxy- or -methoxy-benzenes with the aforedefined 1-hydroxy acylamino-7-hydroxynaphthalenes is advantageously carried out in alkaline medium; the products are worked up and isolated in per se conventional manner.

With the metal-free monoazo dyestuffs, wool can be dyed by an after-metallizing or single bath metallizing process in shades which are fast to washing, fulling and light. In this manner, blue-gray, gray to olive shades are obtained with chromium-yielding agents, and blue to gray shades with cobalt-yielding agents.

The conversion of the metal-free monoazo dyes into the metal complex compounds is preferably effected with chromium- and cobalt-yielding agents. Agents of this character comprise for example chromium salts such as chromic fluoride, chromic sulfate, chromic formate, potassium or ammonium chromic sulfate, sodium or potassium chromate, and sodium or potassium bichromate, and cobalt salts such as cobaltous acetate, cobaltous formate and cobaltous sulfate. The metallization is advantageously carried out in an aqueous slurry or solution or in an organic medium, for example in formamide or in a melt of an alkali metal salt of a low molecular aliphatic monocarboxylic acid. In the latter case, use can also be made of insoluble heavy metal compounds, as for example cobalt hydroxide and cobalt carbonate. Especially advantageous is metallization in aqueous caustic alkaline medium, the metal salts being added in the presence of compounds, such as tartaric acid, citric acid, lactic acid and the like, which keep chromium and cobalt in complex combination in solution in caustic alkaline medium. If the monoazo dyestuffs contain an ortho-hydroxy-ortho'-methoxy-azo grouping as the grouping to be metallized, then the metallization is carried out with splitting of the methoxy group. This is effected by heating the dyestuff to elevated temperature in organic medium, for example in a glycol (e. g. ethylglycol, butylglycol, ethylpolyglycol). The metallization of the monoazo compounds is in all cases carried out in such manner that there is less than one atom of metal per molecule of monoazo compound. In this way, there are produced for example the so-called 1:2-complexes which contain approximately one atom of metal for each two molecules of monoazo compound.

The obtained metal-containing azo dyestuffs are precipitated from aqueous medium by the addition of sodium chloride, if necessary after pouring the organic metallization solution into water, thereupon filtering, if desired, washing, and then drying. These possess an outstanding neutral drawing capacity for wool; they dye the latter from a neutral dyebath and silk and tussah from a weakly acid dyebath in blue-gray, gray to olive shades of very good fastness to washing, fulling and light; they are also suitable for dyeing leather and, more especially, for dyeing synthetic nitrogen-containing fibers, such as polyamide fibers (e. g. nylon, Perlon, etc.). Their good solubility in polar solvents, such for example as acetone, dimethyl-formamide and tetrahydrofurane, makes it possible to employ the new dyestuffs for dyeing artificial fibers spun from organic solutions (such for example as acetate silk, Dacron and the like).

In many cases, mixed metal complex compounds—obtained by metallizing mixtures of two or more monoazo dyestuffs of the present invention—are superior in dyeing properties to the individual metal complex compounds. Such mixed metal complex compounds constitute a further phase of the present invention.

The following examples illustrate the invention without, however, being limitative thereof. In such examples, the parts and percentages are by weight, and the temperatures are in degree centigrade.

EXAMPLE 1

20.2 parts of 2-amino-1-hydroxybenzene-4-sulfonic acid methylamide are diazotized by means of a solution of 6.9 parts of sodium nitrite and 30 parts of water in a mixture of 20 parts of 30% hydrochloric acid and 100 parts of water at 0–5°. The diazo suspension is combined at 0–5° with a solution of 22 parts of 1-hydroxyacetylamino-7-hydroxynaphthalene, 6 parts of sodium hydroxide, 20 parts of anhydrous sodium carbonate, 350 parts of water and 10 parts of a pyridine base mixture. The entire reaction mixture is vigorously stirred for several hours at 0–5°. At the end of this time, the coupling reaction is finished and the almost completely precipitated monoazo dyestuff is isolated. It corresponds to the formula

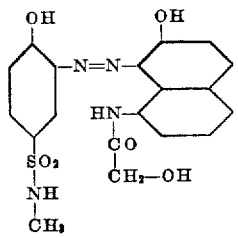

and, in the dry and ground state, is a dark violet powder which dissolves in water to yield a violet coloration and in concentrated sulfuric acid to yield a Bordeaux-red coloration. Its dyeings on wool, prepared by the after-chroming process or by the single bath chroming process are gray and possess very good fastness to washing, fulling and light.

The azo component employed in preparing the monoazo dystuff of the present example can be prepared by heating 1-chloracetylamino-7-hydroxynaphthalene to 160–180° for several hours in formamide.

EXAMPLE 2

21.6 parts of 2-amino-1-hydroxybenzene-4-sulfonic acid ethylamide are coupled, after the manner described in the preceding example, with 25 parts of 1-carbo-(2'-hydroxy)-ethoxyamino-7-hydroxynaphthalene. There is thus obtained a monoazo dyestuff which corresponds to the formula

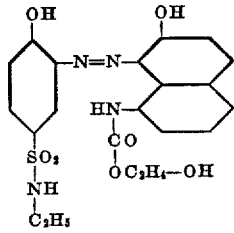

and which is very similar to the product of Example 1.

1 - carbo - (2'-hydroxy)-ethoxyamino-7-hydroxynaphthalene is obtained by heating 1-carbo-(2'-chloro)-ethoxyamino-7-hydroxynaphthalene to 160° in formamide for several hours.

EXAMPLE 3

43 parts of the monoazo dystuff obtainable according to Example 1 are dissolved in 1500 parts of water. 16 parts of sodium bichromate are added to the solution which is then boiled under reflux until complex formation is complete which requires several hours. The pre- cipitated, filtered and dried chromium-containing azo dyestuff, which corresponds to the formula

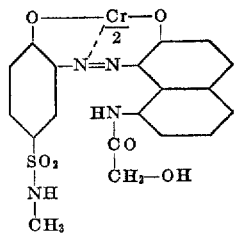

is a dark powder which dissolves in water to yield a blue coloration and in concentrated sulfuric acid to yield a red coloration. It dyes wool, silk and synthetic polyamide fibers in blue-gray shades of excellent fastness to washing, fulling and light.

EXAMPLE 4

21.5 parts of the monoazo dystuff obtainable according to Example 1 and 23.7 parts of the monoazo dyestuff obtainable according to Example 2, are dissolved in 1000 parts of water at 90° with the aid of 6 parts of sodium hydroxide. A solution of 24 parts of sodium bichromate and 4 parts of sodium hydroxide in 100 parts of water are then added to the dyestuff solution, followed by 80 parts of a 20% aqueous glucose solution. The temperature of the metallization solution is then maintained at 90–95° until complex formation is complete, after which the chromium-containing azo dyestuff is isolated and dried. The product which is a mixture of dyestuffs of the formulae

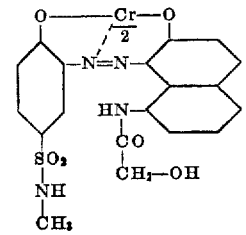

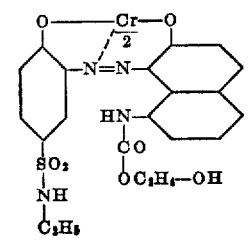

and

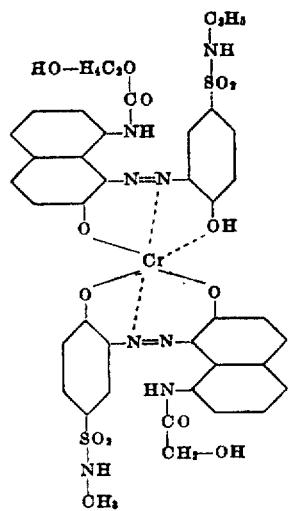

dyes wool, silk and synthetic polyamide fibers in blue-gray shades of excellent fastness to washing, fulling and light.

EXAMPLE 5

44.4 parts of the monoazo dystuff obtained according to data of Example 1 by coupling 21.6 parts of 2-amino-1-methoxybenzene-4-sulfonic acid methylamide with 22 parts of 1-hydroxyacetylamino-7-hydroxynaphthalene, are dissolved in 400 parts of ethylglycol. 50 parts of potassium chromium sulfate are added to the solution which is then heated to 140° until the complex formation is complete. The metallization mass is poured into 1200 parts of water, and the chomium-containing azo dyestuff is salted out, filtered off and dried. It is identical with the product obtained according to Example 3.

EXAMPLE 6

43 parts of the monoazo dystuff obtainable according to Example 1, are dissolved in 800 parts of warm water. To the resultant solution there is then added a mixture of 28.2 parts of cobaltous sulfate, 7.6 parts of tartaric acid, 35 parts of 30% sodium hydroxide solution and 350 parts of water. Complex formation takes place instantaneously. The copper-containing azo dystuff which corresponds to the formula

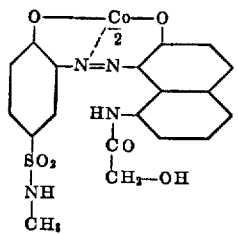

is precipitated, filtered off and dried. It dyes wool, silk and synthetic polyamide fibers in reddish gray shades of very good fastness properties.

EXAMPLE 7

21.5 parts of the monoazo dystuff obtained according to Example 1, and 23.7 parts of the monoazo dyestuff obtained according to Example 2 are dissolved at approximately 90° in 1000 parts of water with the aid of 30 parts of 30% aqueous sodium hydroxide solution. 80 parts of hot aqueous 20% cobaltous sulfate solution are added to the dyestuff solution. Upon completion of the ensuing complex formation, the cobalt-containing azo dyestuff is precipitated, filtered off and dried. It is a mixture of dyestuffs of the formulae

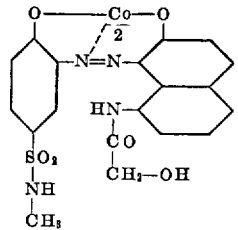

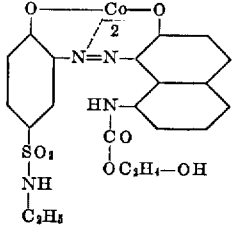

and

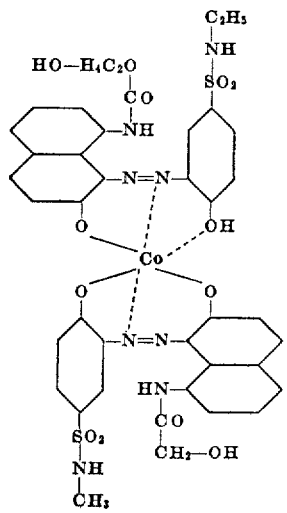

and dyes wool, silk and synthetic polyamide fibers in blue-gray shades of excellent fastness to washing, fulling and light.

The following Table 1 exemplifies additional metal-containing azo dyestuffs which can be prepared according to the preceding examples. In such table the dyestuffs are characterized in column (A) by the 2-amino-1-hydroxy- or -methoxy-benzene employed in preparing the diazo compound, in column (B) by the 1-hydroxy-acylamino-7-hydroxynaphthalene, and in columns (C) and (D) by the shades of the dyeings on wool obtained with the chromium-containing or cobalt-containing azo dyestuffs.

Table 1

| Example No. | (A) | (B) | (C) | (D) |
| --- | --- | --- | --- | --- |
| 8 | 2-amino-1-hydroxy-4-methylsulfonylbenzene. | 1-hydroxyacetylamino-7-hydroxynaphthalene. | Blue-gray | violet-gray. |
| 9 | 2-amino-1-hydroxybenzene-5-sulfonic acid amide. | do | do | Do. |
| 10 | 2-amino-1-hydroxybenzene-4-sulfonic acid-(2'-hydroxy)-ethylamide. | do | do | Do. |
| 11 | 2-amino-1-hydroxybenzene-4-sulfonic acid-(3'-methoxy)-propylamide. | do | do | Do. |
| 12 | 2-amino-1-hydroxy-4-chloro-5-nitrobenzene. | do | do | blue-gray. |
| 13 | 2-amino-1-hydroxybenzene-4-sulfonic acid-(3'-sulfomethylamido)-phenylamide. | do | do | reddish-gray. |

| Example No. | (A) | (B) | (C) | (D) |
|---|---|---|---|---|
| 14 | 2-amino-1-hydroxybenzene-4-sulfonic acid-(3'-sulfamido)-phenylamide. | 1-hydroxyacetylamino-7-hydroxynaphthalene. | Blue-gray | reddish-gray. |
| 15 | 2-amino-1-hydroxybenzene-4-sulfonic acid-(3'-acetylamino)-phenylamide. | ---do--- | ---do--- | Do. |
| 16 | 2-amino-1-hydroxy-4-chlorobenzene. | ---do--- | ---do--- | gray. |
| 17 | 2-amino-1-hydroxy-5-nitrobenzene. | ---do--- | ---do--- | blue. |
| 18 | 2-amino-1-hydroxy-4-chloro-6-nitrobenzene. | ---do--- | ---do--- | Do. |
| 19 | 2-amino-1-hydroxy-4-nitrobenzene. | ---do--- | olive-gray | gray. |
| 20 | 2-amino-1-hydroxybenzene-4-sulfonic acid-(2'-methoxy)-ethylamide. | 1-carbo-(2'-hydroxy)-ethoxyamino-7-hydroxy-naphthalene. | blue-gray | Do. |
| 21 | 2-amino-1-hydroxy-4-nitro-6-acetylaminobenzene. | ---do--- | olive | Do. |
| 22 | 2-amino-1-hydroxy-benzene-4-sulfonic acid amide. | ---do--- | blue-gray | reddish-gray. |
| 23 | 2-amino-1-hydroxy-benzene-4-sulfonic acid-(2'-sulfo-dimethylamido)-phenylamide. | ---do--- | ---do--- | Do. |
| 24 | 2-amino-1-hydroxy-5-nitrobenzene. | ---do--- | ---do--- | blue. |
| 25 | 2-amino-1-hydroxybenzene-4-sulfonic acid-(1'-ethyl-2'-hydroxy)-ethylamide. | ---do--- | ---do--- | gray. |
| 26 | 2-amino-1-hydroxybenzene-4-sulfonic acid-(4'-sulfo-methylamido)-phenylamide. | ---do--- | ---do--- | Do. |
| 27 | 2-amino-1-hydroxybenzene-4-sulfonic acid-(2'-hydroxy)-propylamide. | 1-hydroxyacetylamino-7-hydroxynaphthalene. | ---do--- | reddish-gray. |
| 28 | 2-amino-1-hydroxybenzene-4-sulfonic acid-di-[(2'-hydroxy)-propyl]-amide. | ---do--- | ---do--- | Do. |
| 29 | 2-amino-1-hydroxybenzene-5-sulfonic acid-morpholide. | ---do--- | ---do--- | Do. |
| 30 | 2-amino-1-hydroxybenzene-4-sulfonic acid-ethylamide. | ---do--- | ---do--- | Do. |
| 31 | 2-amino-1-hydroxybenzene-4-sulfonic acid-diethylamide. | ---do--- | ---do--- | Do. |
| 32 | 2-amino-1-hydroxybenzene-4-sulfonic acid-pyrrolidide. | ---do--- | ---do--- | Do. |
| 33 | 2-amino-1-hydroxy-4-methyl-6-acetylbenzene. | ---do--- | ---do--- | Do. |
| 34 | 2-amino-1-hydroxybenzene-4-sulfonic acid-cyclohexylamide. | ---do--- | ---do--- | Do. |
| 35 | 2-amino-1-hydroxybenzene-4-sulfonic acid-benzylamide. | ---do--- | ---do--- | Do. |
| 36 | 2-amino-1-hydroxybenzene-4-sulfonic acid-(2'-hydroxy)-ethylamide. | 1-(2'-hydroxy)-propionyl-amino-7-hydroxy-naphthalene. | ---do--- | Do. |
| 37 | 2-amino-1-hydroxybenzene-4-sulfonic acid-(2'-methoxy)-ethylamide. | 1-(3'-hydroxy)-butyryl-amino-7-hydroxy-naphthalene. | ---do--- | Do. |
| 38 | 2-amino-1-hydroxybenzene-4-sulfonic acid-(3'-methoxy)-propylamide. | 1-carbo-(3'-hydroxy)-propoxyamino-7-hydroxy-naphthalene. | ---do--- | Do. |
| 39 | 2-amino-1-hydroxybenzene-4-sulfonic acid-(2'-hydroxy)-propylamide. | 1-carbo-(4'-hydroxy)-butoxyamino-7-hydroxynaphthalene. | ---do--- | Do. |

By way of illustration, it may be indicated that the formula of the product according to Example 8 is as follows:

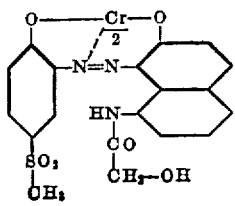

and that the product according to Example 11 is as follows:

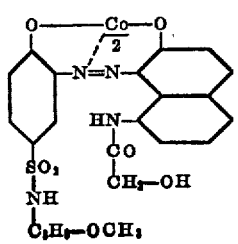

Table 2 exemplifies mixed metal complex compounds from two monoazo dyestuffs which can be obtained after the manner set forth in Example 1. These mixed metal complex compounds are characterized by the content of metal-free monoazo dyestuff which is reacted with one atom of metal; they contain for each atom of metal about 2 mols of the mixture of the two monoazo compounds. In the table, column (E) sets forth the metal used for metallizing the mixture and column (F) indicates the shade of the dyeing obtained on wool with the metal-containing azo dyestuff.

Table 2

| Example No. | First Metal-Free Monoazo Dyestuff | | Second Metal-Free Monoazo Dyestuff | | (E) | (F) |
|---|---|---|---|---|---|---|
| | Mol | According to Example | Mol | According to Example | | |
| 40 | 1 | 1 | 1 | 8 | Cr | blue-gray. |
| 41 | 1 | 1 | 1 | 10 | Cr | Do. |
| 42 | 1 | 1 | 1 | 11 | Cr | Do. |
| 43 | 1.5 | 1 | 0.5 | 11 | Cr | Do. |
| 44 | 1 | 2 | 1 | 11 | Cr | Do. |
| 45 | 1 | 2 | 1 | 22 | Cr | Do. |
| 46 | 1 | 10 | 1 | 11 | Cr | Do. |
| 47 | 1.5 | 11 | 0.5 | 15 | Cr | Do. |
| 48 | 1.5 | 11 | 0.5 | 16 | Cr | Do. |
| 49 | 1 | 2 | 1 | 22 | Co | reddish-gray. |
| 50 | 1 | 9 | 1 | 10 | Co | Do. |
| 51 | 1 | 10 | 1 | 20 | Co | Do. |
| 52 | 1 | 10 | 1 | 22 | Co | Do. |

EXAMPLE 53

A dyebath is prepared from 4000 parts of water, one part of the chromable dyestuff obtained according to Example 1, 1 part of potassium chromate, 7 parts of ammonium sulfate and 10 parts of Glauber's salt, and 100 parts of wool are entered into the bath at 40°. The bath is heated to boiling in the course of 30 minutes and then is maintained at the boil for 90 minutes. The dyed wool is then withdrawn from the bath, washed with water and dried.

EXAMPLE 54

100 parts of wool are entered at 40° into a dyebath consisting of 1 part of the chromium-containing azo dyestuff obtainable according to Example 3, 4000 parts of water and 5 parts of ammonium sulfate. The bath is heated to boiling in the course of 30 minutes and is maintained at the boil for 60 minutes. After cooling for a short time, the dyed wool is withdrawn from the bath, rinsed with water and dried.

Synthetic polyamide fibers are dyed in like manner, as is also silk for which a somewhat lower temperature (for example 95°) is employed.

Having thus disclosed the invention, what is claimed is:

1. A member selected from the group consisting of monoazo dyestuffs and the corresponding cobalt-containing and chromium-containing monoazo dyestuffs, said monoazo dyestuffs, in the metal-free state corresponding to the formula

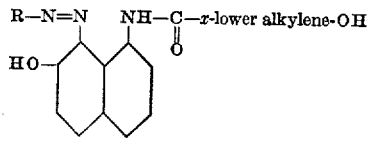

wherein $x$ represents a member selected from the group consisting of a simple carbon-to-carbon bond and a —OCH$_2$-bridge, and R stands for a radical of the benzene series having in ortho-position to the azo group a member selected from the group consisting of hydroxyl and methoxy groups.

2. The monoazo dyestuff which corresponds to the formula

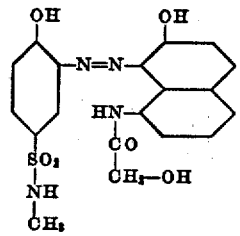

3. The monoazo dyestuff which corresponds to the formula

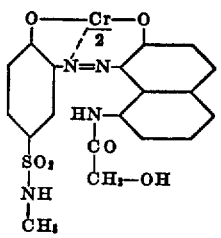

4. A mixture of monoazo dyestuffs of the formulae

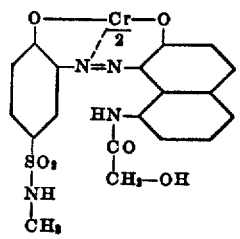

and

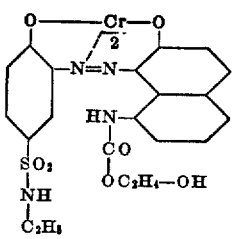

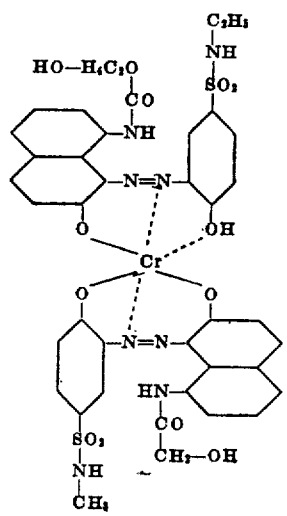

5. The monoazo dyestuff which corresponds to the formula
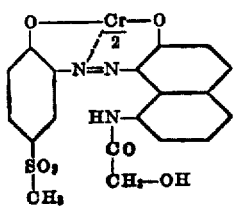
6. The monoazo dyestuff which corresponds to the formula
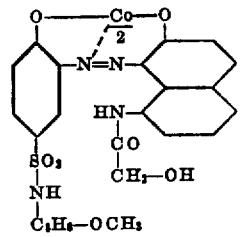
References Cited in the file of this patent
UNITED STATES PATENTS
| | | |
|---|---|---|
| 2,543,610 | Steinemann | Feb. 27, 1951 |
| 2,602,080 | Grimmel et al. | July 1, 1952 |
| 2,623,871 | Schetty et al. | Dec. 30, 1952 |

U. S. DEPARTMENT OF COMMERCE
PATENT OFFICE

CERTIFICATE OF CORRECTION

Patent No. 2,813,853                                                                    November 19, 1957

Willy Steinemann

It is hereby certified that error appears in the printed specification of the above numbered patent requiring correction and that the said Letters Patent should read as corrected below.

Column 2, line 1, for "chlorocyl-" read -- chloracyl- --; line 66, for "monazo" read -- monoazo --; column 3, line 3, for "degree" read -- degrees --; column 5, lines 21 and 28, for "dystuff", in each occurrence, read -- dyestuff --; line 28, for "copper-containing" read -- cobalt-containing --.

Signed and sealed this 18th day of March 1958.

(SEAL)
Attest:

KARL H. AXLINE
Attesting Officer

ROBERT C. WATSON
                                                  Commissioner of Patents